April 7, 1959  T. J. JOHNSON  2,880,935
MEANS FOR ELECTRONIC MULTIPLICATION
Filed Sept. 27, 1954
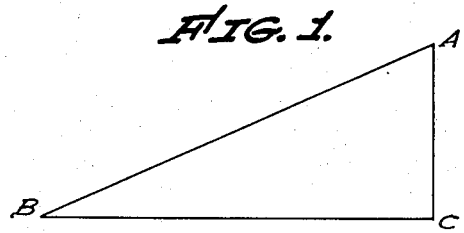
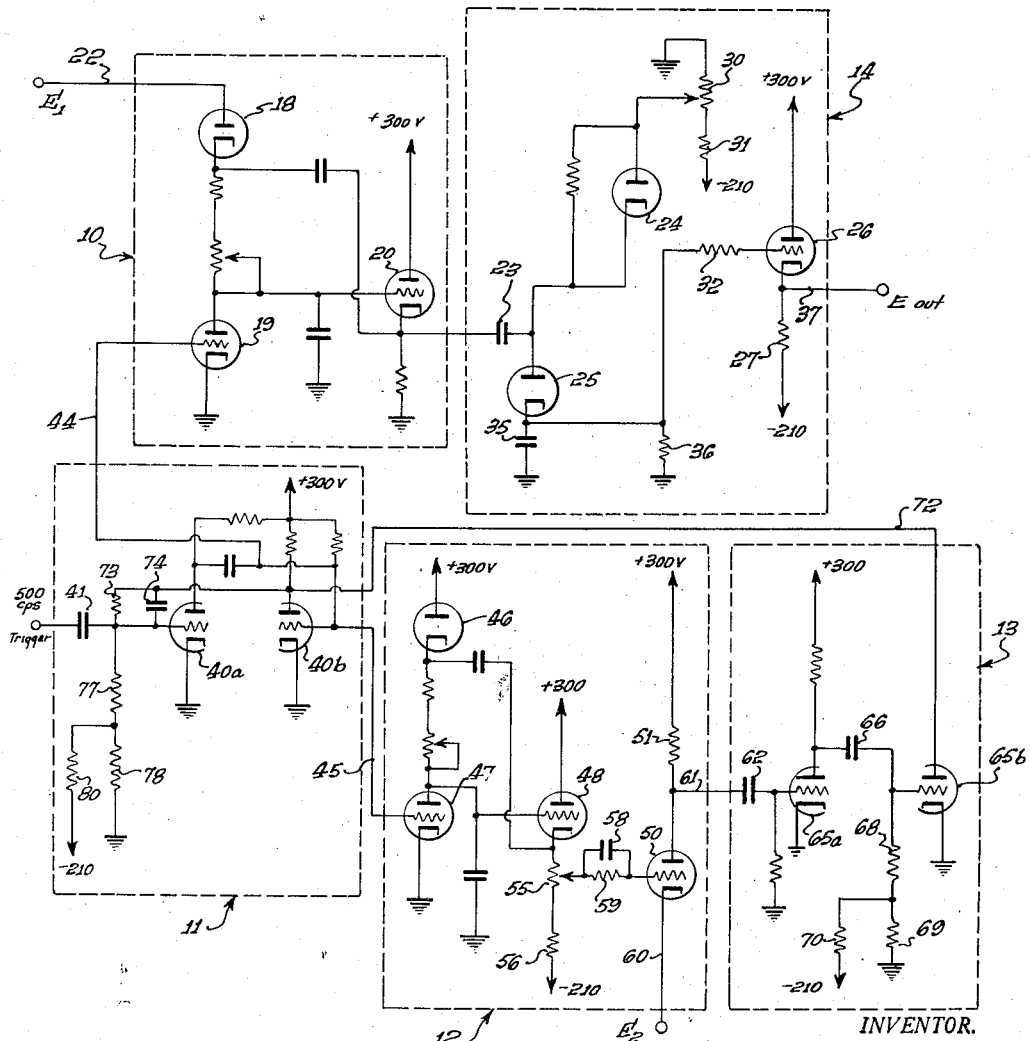
INVENTOR.
THOMAS J. JOHNSON
BY
ATTORNEY.

United States Patent Office 2,880,935
Patented Apr. 7, 1959

2,880,935

MEANS FOR ELECTRONIC MULTIPLICATION

Thomas J. Johnson, Los Angeles, Calif., assignor to Gilfillan Bros. Inc., Los Angeles, Calif., a corporation of California Application September 27, 1954, Serial No. 458,556

11 Claims. (Cl. 235—194)

This invention relates to analog computers and more particularly to an electronic analog multiplier.

The general object of the invention is to provide an analog computation device for multiplying two factors rapidly and with a required degree of accuracy. A further object is to provide such a computing device that may be triggered in a rapid repetitive manner to follow changes in the product of two variables over any desired period of time. The repeated cycles may be at a frequency that, in effect, provides substantially continuous evaluation of the changing product.

In accordance with the invention, multiplication is accomplished by generating a linearized saw-tooth wave to rise from a reference base, fixing the slope of the saw-tooth wave in accord with one of the two factors to be multiplied, limiting the duration of the rise of the saw-tooth wave in accord with the other of the two factors and deriving the product of the two factors from the final value of the saw-tooth wave relative to the base. The preferred apparatus for practicing the invention includes a linearized saw-tooth generator that responds to a first input voltage for determining the slope of the saw-tooth wave and responds to a second input voltage to determine the time duration of the saw-tooth wave, the output of the apparatus being a voltage determined by the final magnitude of the saw-tooth wave. It is apparent that means including a manually operable potentiometer may be used for applying each of the two input voltages to the apparatus and that any suitable voltage-responsive means may be used to detect or to indicate the product of the two factors.

The features and advantages of the invention may be readily understood from the following description of a preferred embodiment of the invention, considered with the accompanying drawing.

In the drawing, which is to be regarded as merely illustrative:

Fig. 1 is a voltage diagram illustrating the principle underlying the invention; and Fig. 2 is a wiring diagram of a selected embodiment of the invention.

The principle underlying the invention may be understood by reference to Fig. 1 in which a right triangle ABC represents the voltages involved in the use of a linear saw-tooth wave to multiply two factors in a substantially instantaneous manner. In the right triangle ABC, the height of the leg AC is proportional to the product of the leg BC and the slope of the hypotenuse AB or the tangent of the angle ABC. If the hypotenuse AB represents a saw-tooth wave rising relative to BC as a base, with the slope of the wave determined by one input voltage and with the time duration of the wave as measured along the line BC determined by a second voltage, the voltage AC will be in proportion to the product of the two voltages.

It is apparent that various types of circuitry may be used to apply this underlying principle to the multiplication of two numbers or factors. Fig. 2, for example, shows schematically how well known components may be combined for this purpose. The components, represented generically in Fig. 2 by dotted blocks, are utilized to multiply together two factors represented respectively by input voltages $E_1$ and $E_2$ and the result of the multiplication is represented by the output voltage $E_{out}$.

The essential component in Fig. 2 is a linearized saw-tooth generator represented by the dotted block 10, which generator may be of various types in various practices of the invention. The slope of the saw-tooth wave generated by the component 10 is determined in a well known manner by the input voltage $E_1$.

Various means including well known gating means may be used in various practices of the invention to control the duration of the operation of the saw-tooth generator 10. In this instance a gating system is used that includes a trigger circuit represented generically by the dotted block 11 and a time analog signal generator represented generically by the dotted block 12, the second input voltage $E_2$ being applied to this time analog signal generator.

In this combination of saw-tooth generator 10, trigger circuit 11 and time analog signal generator 12, the trigger circuit acting in response to an initiating trigger signal, initiates operation of both of the two generators simultaneously and then terminates operation of the saw-tooth generator 10 in response to a terminating trigger signal from the time analog signal generator 12. Preferably the terminating trigger signal from the time analog signal generator 12 is amplified by a suitable amplifier before it is transmitted to the trigger circuit 11, an amplifier represented generically by the dotted block 13 being provided for this purpose. Finally, the terminal or peak voltage value of the saw-tooth wave produced by the generator 10 is converted to the desired $E_{out}$ voltage by a suitable peak-voltage detector represented generically by the dotted block 14.

Turning now to a more detailed description of the wiring diagram in Fig. 2, the specific component represented by the dotted block 10 is a well known bootstrap saw-tooth generator comprising a diode 18 and two triodes 19 and 20. Such a circuit characteristically delivers an accurately linearized saw-tooth voltage. As indicated in the diagram the anode of the triode 20 is connected to a 300 volt positive supply. The first input voltage $E_1$ is applied through a line 22 to the anode of the tube 18 to determine the slope of the generated saw-tooth wave.

The peak voltage developed by the saw-tooth generator 10 is delivered to the peak-voltage detector 14 through a capacitor 23. The peak-voltage detector 14 comprises a first diode 24, a second diode 25 and a triode 26. The first diode 24 functions as a D.-C. restoring means and the triode 26 is coupled to a resistor 27 to function as a cathode follower. The anode of tube 24 is connected to the movable contact of a potentiometer 30 that is connected to ground at one end and at the other end is connected by a resistor 31 to a 210 negative voltage source. The anode of the tube 26 is connected to the positive 300 volt source and the cathode resistor 27 is connected to the 210 negative voltage source. The cathode of tube 25 is connected to the grid of tube 26 through a resistor 32 and is connected to ground by a peak detecting capacitor 35 shunted by a resistor 36. The final $E_{out}$ voltage is delivered to a line 37 connected to the cathode of the cathode-follower tube 26.

The trigger circuit 11 may be a multivibrator of either the monostable or a stable or bistable type. In this instance a well known monostable multivibrator is shown having a tube 40a—40b. Normally tube 40b is conducting, tube 40a being cut off, but a positive triggering pulse delivered to the grid of tube 40a will reverse the state of the multivibrator to cause tube 40a to conduct and tube 40b to be cut off. The multivibrator will automatically return to its normal state after a certain time period, but the natural time period of the multivibrator is of greater duration than the maximum contemplated time analog and therefore is always returned to its normal state by the terminating trigger pulse created by the time analog signal generator 12.

In the present practice of the invention it is contemplated that uniformly spaced positive triggering pulses will be delivered to the grid of the tube 40a through a capacitor 41 at 500 cps. from a suitable timing means, the time interval between the initiating trigger pulses being less than the natural period of the multivibrator but greater than the maximum anticipated time analog. The gate which is developed in this manner by the multivibrator is delivered by a line 44 to the grid of the tube 19 of the saw-tooth generator 10 and is delivered by a line 45 to the time analog signal generator 12 to initiate operations of these two generators simultaneously.

The time analog signal generator 12 may comprise a second bootstrap generator in cooperation with a suitable comparator means. The second bootstrap generator is of the same type as the first-mentioned bootstrap generator and comprises a diode 46, a triode 47 and a triode 48. The comparator means comprises a triode 50 having its anode connected to the 300 volt positive supply by a resistor 51. The anodes of tubes 46 and 48 are connected to the 300 volt positive supply and the cathode of the tube 48 is connected to the 210 negative volt supply by a potentiometer resistor 55 in series with a second resistor 56. The movable contact of the potentiometer 55 is connected to the grid of the comparator tube 50 by a capacitor 58 shunted by a resistor 59 thus coupling the second bootstrap generator with the comparator. The second input voltage $E_2$ is delivered to the cathode of the comparator tube 50 by a line 60 and a line 61 from the anode of the tube 50 delivers the generated signal to the amplifier 13 through a capacitor 62.

The amplifier 13 comprises a double triode 65a—65b with the cathode of tube 65a connected to the grid of tube 65b through a capacitor 66. The grid of tube 65b is connected to a resistor 68 which, in turn, is connected to ground through a resistor 69 and is connected to the negative 210 volt source by a resistor 70. The cathodes of both tubes 65a and 65b are grounded and the anode of the tube 65b is connected by a line 72 to the cathode of the multivibrator tube 40b. The anode of the multivibrator tube 40b is connected to the grid of tube 40a through a resistor 73 shunted by a capacitor 74. The grid of tube 40a is connected to a resistor 77 which is connected to ground through a resistor 78 and is connected to the 210 negative voltage source through a resistor 80.

The point at which the comparator tube 50 begins to conduct is determined by the second input voltage $E_2$. When the comparator tube 50 starts to conduct the potential of its anode drops and thus produces a falling voltage signal which is transmitted to the grid of the amplifier tube 65a. The result is the development of a positive going signal at the anode of amplifier tube 65a and a greatly amplified steep front negative going signal at the anode of amplifier tube 65b, this last signal being the terminating trigger signal that is transmitted back to the multivibrator through the line 72 to terminate the gate by restoring the multivibrator to its normal state.

From the foregoing it can be seen that the application of the 500 cps. positive initiating trigger signal to the multivibrator causes a gate action in which the multivibrator simultaneously initiates operation of the saw-tooth generator 10 and the time analog signal generator 12. The slope of the saw-tooth wave developed by the generator 10 is determined by the voltage analog of one of the two factors that are to be multiplied together and the time analog signal generator is governed by the voltage analog of the second factor to terminate operation of the multivibrator thereby to terminate operation of the saw-tooth generator. As a result a 500 cps. $E_{out}$ voltage signal will be produced that will be in proportion to the desired product. It is apparent that continual repetition of the cycle at the frequency of 500 cps. provides substantially continuous information to follow the changing value of $E_{out}$.

In the foregoing description of the invention it has been assumed that the time constant of the peak-detecting capacitor 35 and the associated resistor 36 is not of such magnitude as to conflict with the rate of change of the $E_{out}$ voltage signal. If, however, the rate of change of the $E_{out}$ voltage signal is so rapid as to create such a conflict, the conflict may be avoided simply by resorting to expedients well known in the art for discharging the peak-detecting capacitor 35 immediately prior to each new positive initiating pulse applied to the multivibrator.

My description in detail of a selected practice of the invention by way of example and to illustrate the principles involved will suggest various changes, substitutions and other departures from my disclosure that properly lie within the spirit and scope of the appended claims.

I claim:

1. An analog computer for multiplying two factors, comprising: means to provide a first input voltage having a value in accord with one of the two factors; means to provide a second input voltage having a value in accord with the other of the two factors; means to generate a linearized saw-tooth wave relative to a base; means responsive to said first input voltage to determine the slope of said saw-tooth wave; and means to initiate operation of said saw-tooth generator and to limit the duration of operation of said generator in accord with the value of said second input voltage.

2. An analog computer for multiplying two factors, comprising: means to provide a first input voltage having a value in accord with one of the two factors; means to provide a second input voltage having a value in accord with the other of the two factors; means to generate a linearized saw-tooth wave relative to a base; means responsive to said first input voltage to determine the slope of said saw-tooth wave; means responsive to the second input voltage to limit the time duration of said saw-tooth wave; and means to detect the final voltage value of said saw-tooth wave relative to said base.

3. A computer as set forth in claim 2 which includes: trigger means to initiate operation of said saw-tooth generator; and means responsive to both said trigger means and said second input voltage to limit the duration of operation of said saw-tooth generator.

4. A computer as set forth in claim 3 in which said means responsive to both said trigger means and said second input voltage includes a second means to generate a saw-tooth wave to time the duration of the first-mentioned saw-tooth wave.

5. A computer as set forth in claim 4 in which said means responsive to both said trigger means and said second input voltage includes a comparator responsive to the rise of said second saw-tooth wave to terminate the first-mentioned saw-tooth wave when said second saw-tooth wave approaches the magnitude of said second input voltage.

6. A computer as set forth in claim 5 which includes an amplifier responsive to said comparator means, the output of said amplifier terminating operation of said first saw-tooth generator.

7. An analog computer for multiplying two factors, comprising: means to provide a first input voltage having a value in accord with one of the two factors; means to provide a second input voltage having a value in accord with the other of the two factors; means to generate a linearized saw-tooth wave relative to a base; means responsive to said first input voltage to determine the slope of said saw-tooth wave; means to generate a time analog signal in accord with the second input voltage; means to initiate operation of said two generators simultaneously; means to terminate operation of said first-mentioned generator in response to said time analog signal; and means to detect the peak-voltage of said linearized saw-tooth wave.

8. A computer as set forth in claim 7 in which said means to initiate operation of said two generators operates cyclically for continual repetitive multiplication of the two factors.

9. An analog computer for multiplying two factors, comprising: means to provide a first input voltage having a value in accord with one of the two factors; means to provide a second input voltage having a value in accord with the other of the two factors; means to generate a linearized saw-tooth wave relative to a base; means responsive to said first input voltage to determine the slope of said saw-tooth wave; gate means to initiate operation of said saw-tooth generator and to limit the duration of operation of said generator in accord with the value of said second input voltage; and means to trigger said gate means.

10. A computer as set forth in claim 9 in which said gate means includes a multivibrator to initiate operation of said saw-tooth generator, a second saw-tooth generator responsive to the multivibrator, and comparator means responsive to both the second saw-tooth generator and said second input voltage, said multivibrator being responsive to said comparator means to terminate operation of said first-mentioned saw-tooth generator.

11. A computer as set forth in claim 10 in which said trigger means operates automatically at uniform time intervals and said multivibrator is a monostable multivibrator having an inherent operating period longer than said time intervals.

References Cited in the file of this patent
UNITED STATES PATENTS
2,652,194    Hirsch _____ Sept. 14, 1953

OTHER REFERENCES

The H. R. E. Simulator, An Analog Computer for Solving the Kinetic Equations of a Homogeneous Reactor (Collier et al.). Published by Oak Ridge National Laboratory, Oak Ridge, Tennessee, September 24, 1954, pages 15–20.

Trans. of IRE Professional Group on Electronic Computers (Freeman et al.), March 1954, pages 11–17.